United States Patent [19]
Toedtman et al.

[11] Patent Number: 5,612,520
[45] Date of Patent: Mar. 18, 1997

[54] SUSPEND SWITCH FOR PORTABLE ELECTRONIC EQUIPMENT

[75] Inventors: Thomas Toedtman, Lake Forest; Robert D. Tusan, Laguna Niguel, both of Calif.

[73] Assignee: AST Research, Inc., Irvine, Calif.

[21] Appl. No.: 485,084

[22] Filed: Jun. 7, 1995

[51] Int. Cl.$^6$ .............................. H01H 13/14; H01H 3/16
[52] U.S. Cl. ...................... 200/16 D; 200/5 A; 200/50.1; 200/61.7; 200/61.78
[58] Field of Search .................................... 200/5 K, 5 A, 200/16 R–16 D, 50.01, 50.02, 50.1, 61.7, 61.71, 61.73, 61.74, 61.76, 61.78, 61.81, 520, 530, 532, 534, 535, 537, 245–247, 249, 251, 275, 283, 341; 340/700; 364/708

[56] References Cited

U.S. PATENT DOCUMENTS

| | | | |
|---|---|---|---|
| 2,469,650 | 5/1949 | Isserstedt | 200/5 |
| 4,556,765 | 12/1985 | Shaw et al. | 200/61.71 |
| 4,605,830 | 8/1986 | Reid | 200/73 |
| 4,694,130 | 9/1987 | Kitzmann et al. | 200/314 |
| 5,077,551 | 12/1991 | Sattols | 340/700 |

Primary Examiner—Cassandra C. Spyrou
Assistant Examiner—Michael A. Friedhofer
Attorney, Agent, or Firm—Knobbe, Martens, Olson & Bear L.L.P

[57] ABSTRACT

A suspend (sleep) switch for a portable electronic device, such as a notebook computer, is mounted on a printed circuit board. The suspend switch includes a first contact which is positioned in juxtaposed relationship with a second contact. The contacts are formed from an electrically conductive metal or other electrically conductive material which is sufficiently resilient to support an actuator and to hold the two contacts apart in normal operation. In addition, the resiliency of the two contacts allows the two contacts to adjust to different distances between the printed circuit boards on which the contacts are mounted and the cover of the electronic device which constrains the actuator. When the cover of the electronic device is closed, the actuator pushes the two contacts into electrical contact, preferably with a wiping motion, to provide an electrical connection which can be sensed by circuitry on the printed circuit board. The contacts are mounted so that the contacts can accommodate a wide range of overtravel of the actuator. On the other hand, the amount of pre-travel required to engage the contacts (i.e., close the switch) is predetermined by a pair of projections extending from the cover of the electronic device, and the pre-travel can be held to close tolerances to assure that the switch is closed each time the cover of the electronic device is closed.

13 Claims, 7 Drawing Sheets

FIG. 25

SUSPEND SWITCH FOR PORTABLE ELECTRONIC EQUIPMENT

BACKGROUND OF THE INVENTION

1. Field of the Invention

The present invention is in the field of portable electronic equipment, and, in particular, is in the field of portable computers having hinged enclosures wherein, when the covers of the hinged enclosures are closed, a switch is activated to enable the portable computer to enter a suspended mode of operation to reduce the power consumption of the portable computer.

2. Description of the Related Art

Portable electronic equipment, such as portable computers (e.g., laptop computers, notebook computers, palm computers, and the like), are powered by batteries when operated away from a convenient AC power source. Because the operating capacities of batteries are limited, much effort has been expended in reducing the power required by the portable computers. In particular, such portable computers typically include a microprocessor, one or more disk drives, a display, such as a liquid crystal display (LCD), and numerous supporting components, each of which requires power from one or more batteries when the portable computer is operational.

One feature which has been added to certain portable computers is a so-called "suspend switch." Basically, a portable computer has a base portion which supports a keyboard. The base portion is hinged to a cover portion which usually includes the video display (e.g., an LCD). When the cover portion is closed with the portable computer in operation, it is assumed that the because the user is no longer able to observe the display or use the keyboard, it is likely that the user is not going to be actively using the portable computer for awhile, but, on the other hand, the user does not want to turn the portable computer off in order to avoid losing any data that may be resident in the memory of the portable computer. Furthermore, a considerable amount of time is required to gracefully exit some programs and shut the portable computer down, followed by considerably more time to re-boot the computer when the user wants to resume the interrupted task. Thus, instead of requiring the user to shut the portable computer down completely in order to preserve the energy stored in the battery, many portable computers provide a "suspend mode" of operation wherein the power to many energy consuming components, such as the LCD, is turned off, while power continues to be provided to the memory and other selected components necessary to enable the portable computer to successfully resume operation when power is fully restored.

In some portable computers, the suspend mode is activated by a user-activated switch or by a combination of keyboard keys prior to closing the cover. On other portable computers, the suspend mode is automatically activated by a suspend switch which is caused to close (or open) when the cover of the portable computer is closed. This eliminates the need for the user to remember to activate the suspend mode prior to closing the cover of the portable computer.

The automatic suspend switch has proven to be very useful in extending the operating time of a portable computer between battery recharging; however, it has been found that the mechanical operation of the suspend switch does not readily lend itself to economical implementation on portable computers. In particular, in order to facilitate the automation of the manufacturing of portable computers, it is desirable that the suspend switch be mounted directly onto a printed circuit board within the portable computer. However, the bases and covers of many portable computers are constructed from molded plastic parts which tend to have a fairly wide range of dimensional tolerances with respect to the fitting of parts with respect to each other. Thus, it has found to be difficult to find a simple and economical printed circuit board mounted mechanical switch that will consistently operate within the range of tolerances of the plastic parts. In particular, commercially available switches do not have a sufficiently wide range of pre-travel (movement of the switch actuator before the switch contacts engage) and overtravel (permissible movement of the actuator after the switch contacts engage) to accommodate the typical range of positions of the printed circuit with respect to the top of the base of the portable computer. Thus, some portable computers may be constructed with the pre-travel too large such that the switch does not activate when the cover is fully closed, while other portable computers constructed within the same tolerance limits may not have sufficient overtravel such that cover cannot be completely closed or such that the switch or printed circuit board is stressed when the cover is closed.

Thus, it can be seen that a need exists for a printed circuit board mounted switch which can be used in a portable computer or other portable electronic device to accurately detect when a cover or other moveable part is moved to an activating position. In particular, a need exists for such a switch having an accurately determinable pre-travel with respect to the top of the base so that the switch will unfailingly activate when the cover is closed on the base. Further, the switch needs to provide sufficient overtravel so that the cover can completely close without binding and without stressing either the switch, the printed circuit board or the cover. The switch also needs to tolerate a reasonable range of variations in the mounting distance of the printed circuit board with respect to the top of the base.

SUMMARY OF THE INVENTION

One aspect of the present invention is a printed circuit board mounted switch which accommodates varying distances between a printed circuit board on which the switch is mounted and a surface which defines the location of an actuator which actuates the switch. The switch comprises a first switch contact which is electrically and mechanically connected to the printed circuit board. The first switch contact has a first contact portion and a first spring-like mounting portion. The first spring-like mounting portion allows the first contact portion to be positioned a varying distance from the printed circuit board. A second switch contact is electrically and mechanically connected to the printed circuit board. The second switch contact has a second contact portion and a second spring-like mounting portion. The second spring-like mounting portion allows the second contact portion to be positioned a varying distance from the printed circuit board. A first contact positioner is mounted on the surface. The first contact positioner positions the first contact portion at a first predetermined location with respect to the surface. A second contact positioner is also mounted on the surface. The second contact positioner positions the second contact portion at a second predetermined location with respect to the first predetermined location. The second predetermined location is different from the first predetermined location to space the first contact portion apart from the second contact portion. An actuator is mounted with respect to the surface. The actuator moves with respect to the first contact positioner and the second contact positioner to move the first contact portion into electrical and mechanical engagement with the second contact portion to close the switch.

A second aspect of the present invention is a switch for a printed circuit board mounted within an enclosure and activated by a force applied external to the enclosure. The switch comprises a first resilient contact which has a respective first end portion electrically and mechanically mounted on the printed circuit board and which has a respective second free end portion. A second resilient contact of the switch has a respective first end portion electrically and mechanically mounted on the circuit board and has a respective second free end portion. A first projection extends from an inside surface of the enclosure. The free end portion of the first contact rests against the first projection. A second projection also extends from the inside surface of the enclosure. The free end portion of the second contact rests against the second projection. The free end portion of the second contact is spaced apart from the free end portion of the first contact by a distance determined by the first and second projections. An actuator extends through the enclosure and moves against the free end portion of the first contact. The actuator is responsive to an applied force to move the free end portion of the first contact into electrical engagement with the free end portion of the second contact.

Another aspect of the present invention is a switch for a printed circuit board within an enclosure having a base and a cover, wherein the base has a top and a bottom, wherein the cover has a surface which is in proximity with the top of the base when the cover is closed with respect to the base, and wherein the printed circuit board is mounted within the base between the top and bottom. The switch comprises first and second flexible electrical conductors having respective first ends mounted on the printed circuit board. The two conductors have respective second ends biased to extend toward the top of the base. The switch further comprises first and second projections mounted with respect to the top of the base between the top and the printed circuit board. The first projection positions the second end of the first conductor away from the top at a first location. The second projection positions the second end of the second conductor away from the top at a second location. The second location is spaced apart from the first location by a predetermined distance such that the second end of the first conductor is electrically isolated from the second end of the second conductor. An actuator extends through the top of the base. The actuator is in engagement with the second end of the first conductor. The actuator is engaged by the surface of the cover when the cover is closed with respect to the base. The actuator moves the second end of the first conductor toward the second end of the second conductor to effect electrical contact between the second ends when the cover is closed.

A further aspect of the present invention is a switch for a printed circuit board mounted within an enclosure. The switch is activated by a force applied external to the enclosure. The switch comprises a first projection and a second projection, both attached to an inside surface of the enclosure. A first resilient contact has a respective first end portion electrically and mechanically mounted to the printed circuit board and having a respective second free end portion. The free end portion of the first contact rests against the first projection at a first contact resting location in a first plane. A second resilient contact has a respective first end portion electrically and mechanically mounted to the circuit board and has a respective second free end portion. The free end portion of the second contact rests against the second projection at a second contact resting location in a second plane substantially parallel with the first plane. The free end portion of the second contact is spaced from the free end portion of the first contact by a distance substantially equal to a distance between the first plane and the second plane. An actuator extends through the enclosure and moves against the free end portion of the first contact. The actuator is responsive to an applied force to move the free end portion of the first contact into electrical engagement with the free end portion of the second contact.

A further aspect of the present invention is a method of installing a cover actuated switch in an electronic device having a base with a printed circuit board mounted therein and having a cover moveable with respect to the base. The method includes the steps of mounting a first end of a first flexible contact to the printed circuit board and mounting a first end of a second flexible contact to the printed circuit board. The method includes the further steps of mounting the printed circuit board to the base with respective second ends of the first and second contacts proximate to an inside surface of a wall of the base. The inside surface has projections thereon which engage the first and second contacts at first and second locations to position the second end of the first contact in a spaced apart relationship with the second end of the second contact. The method also includes the step of positioning an actuator through the wall of the base such that a first end of the actuator engages the second end of the first contact and so that a second end of the actuator is exposed in engageable relationship to the cover. The actuator moves when engaged by the cover to move the second end of the first contact into electrical engagement with the second end of the second contact.

BRIEF DESCRIPTION OF THE DRAWINGS

The present invention will be described below in connection with the accompanying drawing figures in which.

DETAILED DESCRIPTION OF THE PREFERRED EMBODIMENT

Figure 1:
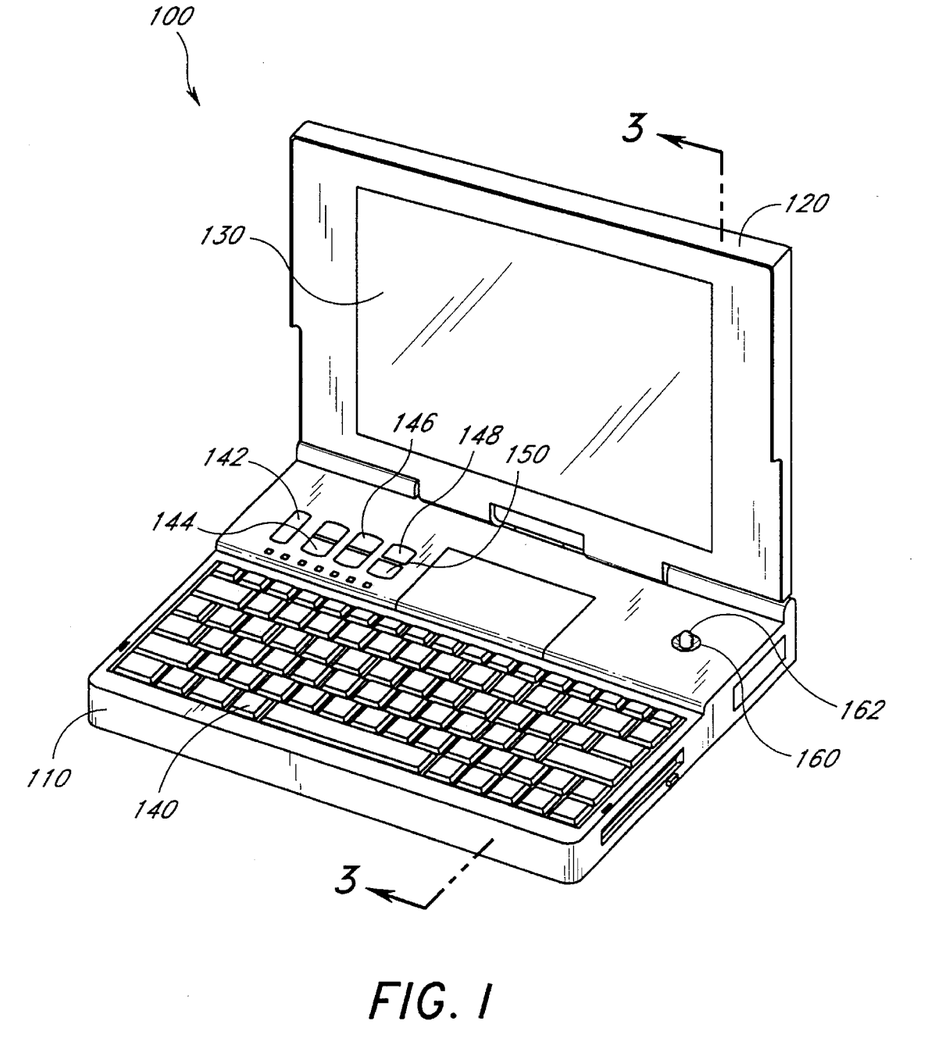
FIG. 1 illustrates a perspective view of a notebook computer into which the suspend switch of the present invention may be incorporated.

FIG. 1 illustrates an exemplary notebook computer 100 into which the present invention may advantageously be incorporated. As illustrated, the notebook 100 comprises a base portion 110 and a cover portion 120. The cover portion 120 typically supports a display screen 130 which may be a liquid crystal display (LCD) or other suitable display which can be operated for a reasonable time duration using batteries. In many cases, the display screen 130 is back lighted by a light source (not shown).

The base portion 110 supports a keyboard 140, an on-off switch 142, and a plurality of display adjustment switches, including a brightness switch 144, a contrast switch 146 and a display on-off switch 148. The operation of such switches is wellknown to those skilled in the art and will not be discussed herein.

The base portion 110 may also support a manual suspend switch 150. The suspend switch 150 may be activated by a user to cause the notebook computer 100 to enter into a low-power mode of operation wherein the current state of the computer is maintained, but no further operations occur other than operations required to maintain the current state of timers and the like. In particular, the display screen 130 and its back lighting source (if any) are turned off, and an internal processor (not shown) is caused to operate at a lower frequency or to cease operations altogether. When the suspend switch 150 is again manipulated, the notebook computer 100 is restored to operation by turning the display screen 130 and its light source (if any) back on and returning the internal processor to its normal frequency of operation. Because the notebook computer 100 was not turned off completely, the state of internal registers (not shown) and the data in memory (not shown) were not changed, and the notebook computer 100 can thus resume operation as if it had been running continuously. The circuitry and techniques required to implement the suspend mode of operation in a notebook computer or other such electronic device are well-known to those skilled in the art and will not be described in detail herein. Thus, the computer system is represented herein as a global block 156 in FIG. 2.

Figure 2:
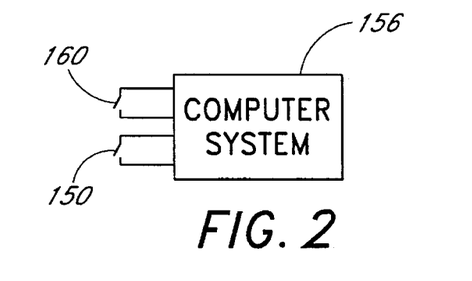
FIG. 2 illustrates a highly simplified block diagram of a computer system having a manually activated suspend switch and a cover activated suspend switch may be incorporated.

Many notebook computers, such as the notebook computer 100, have an alternative suspend switch that does not require manual manipulation. In particular, the notebook computer 100 includes a cover activated suspend switch 160 which is mounted on the top surface of the base portion 110 as shown in FIG. 1 and is electrically connected to the computer system 156 as shown in FIG. 2. The suspend switch 160 has an actuator 162 which is engaged when the cover portion 120 is moved into engaging relationship with the base portion 110. The activation of the suspend switch 160 causes the notebook computer 100 to go into the suspend mode of operation as before, but with the usual difference that when the cover is opened and the suspend switch 160 is no longer activated, the notebook computer 100 will automatically exit from the suspend mode of operation and resume normal operation.

Cover activated suspend switches, such as the suspend switch 160, are advantageous because they do not require the user of the notebook computer 100 to remember to manually activate the suspend switch 150 when the user wants to temporarily quit using the notebook computer 100. In particular, the user only has to close the cover portion 120 against the base portion 110, and the notebook computer 100 automatically enters the suspend mode of operation. Thus, there is no possibility of the notebook computer 100 remaining at full power operation with the display screen 130 operational with the cover closed. That is, assuming that the suspend switch 160 operates properly.

Figures 3, 4:
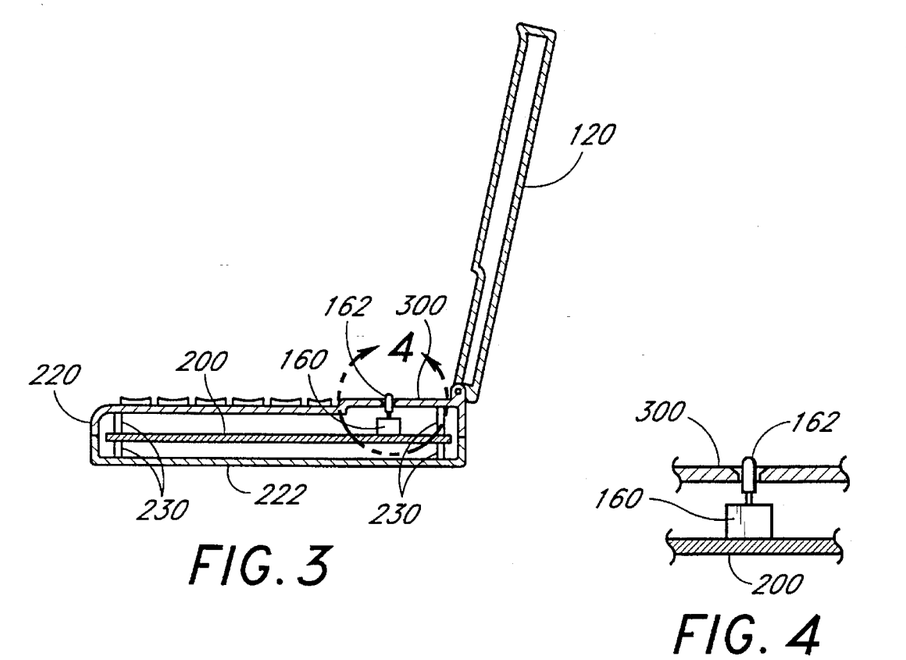
FIG. 3 illustrates a cross-sectional view of a notebook computer having a conventional suspend switch mounted on a printed circuit board therein, and showing the cover in an open position.
FIG. 4 illustrates an enlarged cross-sectional view of the suspend switch of FIG. 3 showing the relationship of the top of the actuator with respect to the surface of the base portion of the notebook computer in more detail.

It has been found however that conventional cover activated suspend switches 160 are unreliable or are expensive to install. In particular, most conventional notebook computers 100 are manufactured using molded plastic parts for the base portion 110 and the cover portion 120. As illustrated in FIGS. 3 and 4, the base portion 110, for example, encloses a printed circuit board 200 on which the primary electronic components, such as the microprocessor, the memory, and other supporting circuits are mounted. The printed circuit board 200 is held in position with respect to an upper half 220 and a lower half 222 of the base portion 110 by a plurality of standoffs 230. The standoffs 230 may be commercially available standoffs, or, in exemplary notebook computers 100, may be molded into the plastic of the upper half 220 and lower half 222 of the base portion 110.

Figure 5:
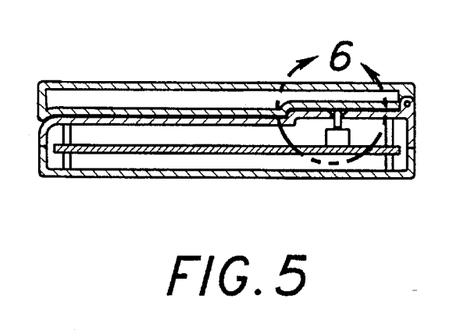
FIG. 5 illustrates the cross-sectional view of FIG. 3 with the cover of the notebook computer closed against the base portion and showing the effect upon the actuator of the suspend switch.
Figure 6:
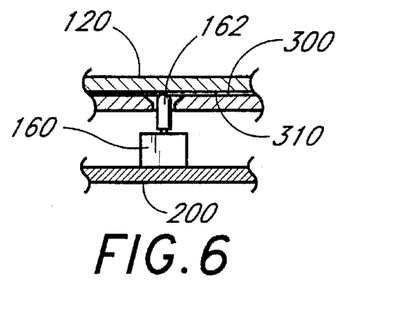
FIG. 6 illustrates an enlarged cross-sectional view of the suspend switch of FIG. 5 showing the relationship of the top of the actuator with respect to the surface of the base portion of the notebook computer in more detail.

Although a conventional electrical switch could be mounted onto the base portion 110 and then wired to the printed circuit board 200, such a construction technique does not readily lend itself to automated manufacturing of the notebook computer 100. Preferably, the suspend switch 160 should be mounted directly onto the printed circuit board 200, as illustrated in FIG. 3, during the circuit board manufacturing process, a process which can be highly automated. Then, when the printed circuit board 200 is mounted in the base portion 110, the suspend switch should be positioned to be actuated by the actuator 162 when the cover portion 120 is closed as illustrated in FIGS. 5 and 6. However, as illustrated in FIGS. 7–14, the tolerances associated with conventional manufacturing and assembly of molded plastic components and conventional manufacturing and assembly of printed circuit boards, in addition to the tolerances within a conventional switch assembly, precludes reliable operation of the suspend switch 160.

Figures 7, 8:
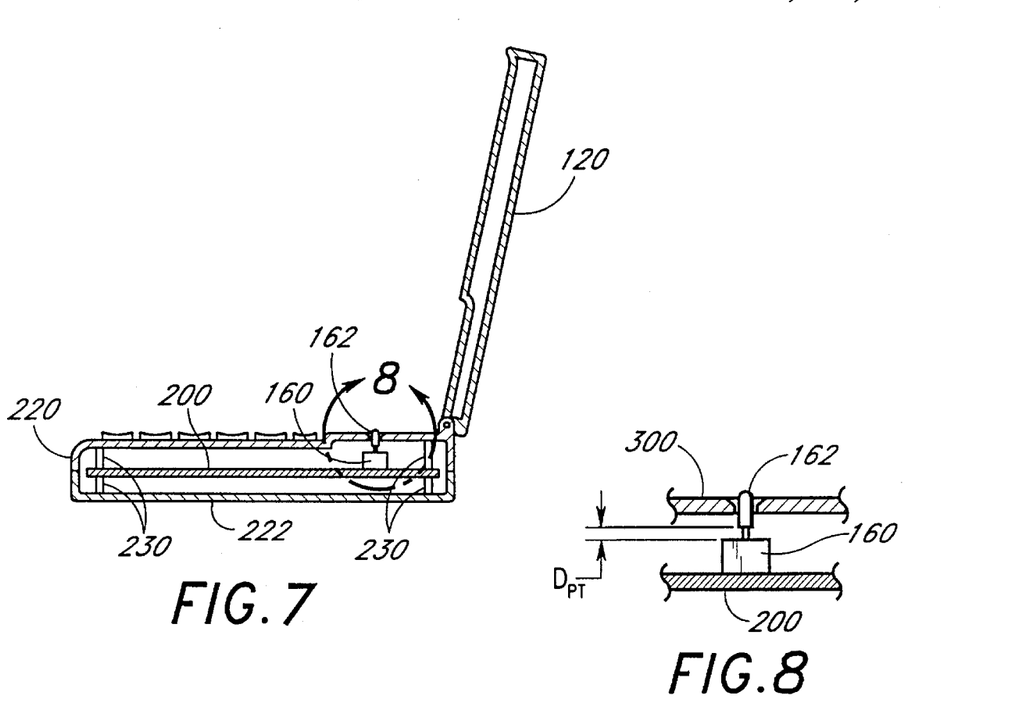
FIGS. 7–10 are similar to FIGS. 3–6 and illustrate the effect of the printed circuit board being mounted too far from the upper half of the base portion of the notebook computer such that the actuator of the suspend switch is not moved through the entire pre-travel distance and does not close.
Figure 9:
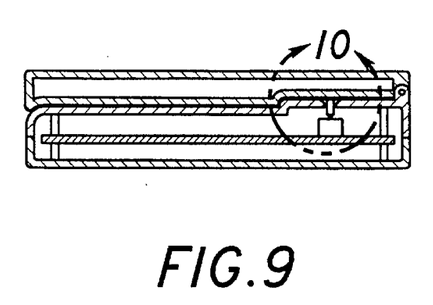
Figure 10:
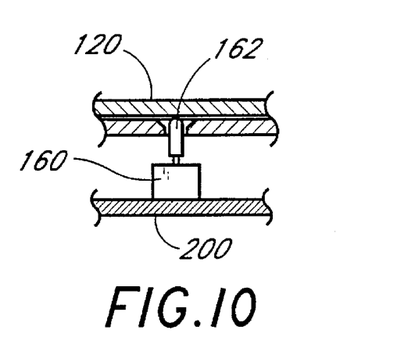
Figure 11:
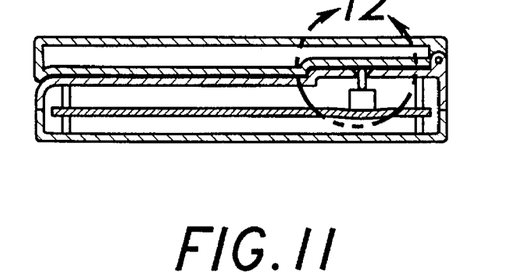
FIG. 11 is a cross-sectional view of the notebook computer similar to FIG. 3 and illustrating the effect of the printed circuit board being mounted too close to the upper half of the base portion of the notebook computer such that the actuator moves beyond the combined distance of the pre-travel and overtravel of the suspend switch and causes the printed circuit board to be flexed.
Figure 12:
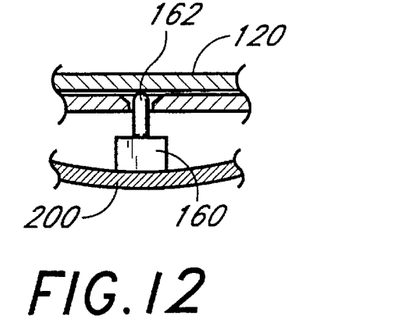
FIG. 12 is an enlarged cross-sectional view of the suspend switch in FIG. 11 showing the flexing of the printed circuit board in more detail.
Figure 13:
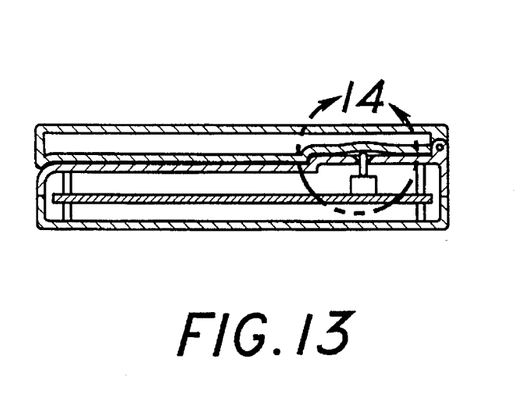
FIG. 13 is a cross-sectional view of the notebook computer similar to FIG. 3 and illustrating the effect of the printed circuit board being mounted too close to the upper half of the base portion of the notebook computer such that the actuator moves beyond the combined distance of the pre-travel and overtravel of the suspend switch and causes the cover to be flexed.
Figure 14:
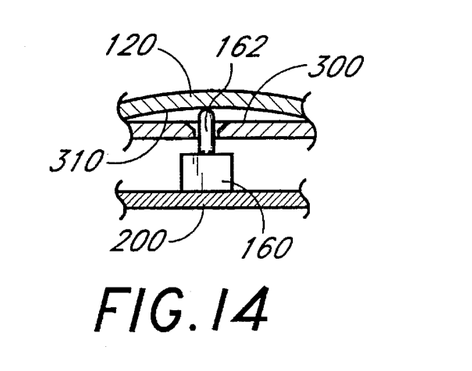
FIG. 14 is an enlarged cross-sectional view of the suspend switch in FIG. 13 showing the flexing of the cover in more detail.

FIGS. 7–10 illustrate the problem which occurs when the manufacturing tolerances cause the printed circuit board 200 supporting the suspend switch 160 to be mounted too far from a top surface 300 of the cover portion 110. In particular, the actuator 162 of the suspend switch 160 does not extend sufficiently above the top surface 300 to be successfully engaged by an engaging surface 310 of the cover portion 120 when the cover portion 120 is closed. As illustrated in FIGS. 7 and 8, a typical suspend switch 160 has a pre-travel distance $D_{PT}$ through which the actuator 162 must move before the internal contacts of the suspend switch 160 will engage. As illustrated in FIGS. 9 and 10, although the engaging surface 310 may touch the actuator 162 as the cover portion 120 is closed, there may not be sufficient movement afterwards to move the actuator 162 through the entire pre-travel distance such that the internal contacts of the suspend switch 160 fully engage to complete the electrical connection within the suspend switch 160. The manufacturing tolerances of the suspend switch 160, the cover portion 120 and the associated inserts 230, and the manufacturing tolerances of the assembly of these components also combine to cause or contribute to cause this condition. Thus, although the user may think that the notebook computer 100 has entered the suspend mode of operation, the notebook computer 100 continues to operate at its normal frequency and the display screen 130 continues to be on and back lighted. The user may thus be surprised by depleted batteries after a much shorter time of operation than expected.

In contrast to FIG. 7–10, FIGS. 11–14 illustrate the problem which occurs when manufacturing tolerances cause the printed circuit board 200 is mounted too close to the top surface 300 of the base portion 110. In particular, the actuator 162 of the suspend switch 160 may extend beyond the top surface 300 by a sufficient amount that the actuator 162 is engaged by the engaging surface 310 of the cover portion 120 when the cover portion 120 is closed. However, because the printed circuit board 200 is mounted too close to the top surface 300, the actuator 162 of the suspend switch 160 is moved through its entire amount of pre-travel (i.e., travel prior to engagement of the internal contacts of the suspend switch 160) and through its entire amount of overtravel (allowed travel of the internal contacts after engagement). When this occurs, the actuator 162 stops moving with respect to the body of the suspend switch 160, and one of two things generally happens. If the printed circuit board 200 is somewhat flexible in the area where the cover activated suspend switch is mounted, the printed circuit board 200 may flex as illustrated by the exaggerated displacement of the printed circuit board 200 in FIGS. 11 and 12. On the other hand, if the printed circuit board 200 does not flex, the cover portion 120 may not fully close, or, if forced closed, may flex the plastic of the engaging surface 310 proximate to the actuator 162, as illustrated by the exaggerated displacement of the engaging surface 310 in FIGS. 13 and 14. In either case, the pressure on the suspend switch 160 to cause the flexing of the printed circuit board 200 or the engaging surface 310 may reduce the operational life of the cover activated suspend switch 160. The manufacturing tolerances of the suspend switch 160, the cover portion 120 and the associated inserts 230, and the manufacturing tolerances of the assembly of these components also combine to cause or contribute to cause this condition.

It can thus be seen that an improved cover activated suspend switch 160 is desirable in order to avoid the manufacturing problems associated with a conventional suspend switch. As illustrated in FIGS. 15–25, and as discussed below, the cover activated suspend switch 500 of the present invention avoids the deficiencies of the conventional suspend switch 160 and is easy to assemble using conventional printed circuit board assembly techniques.

Figure 15:
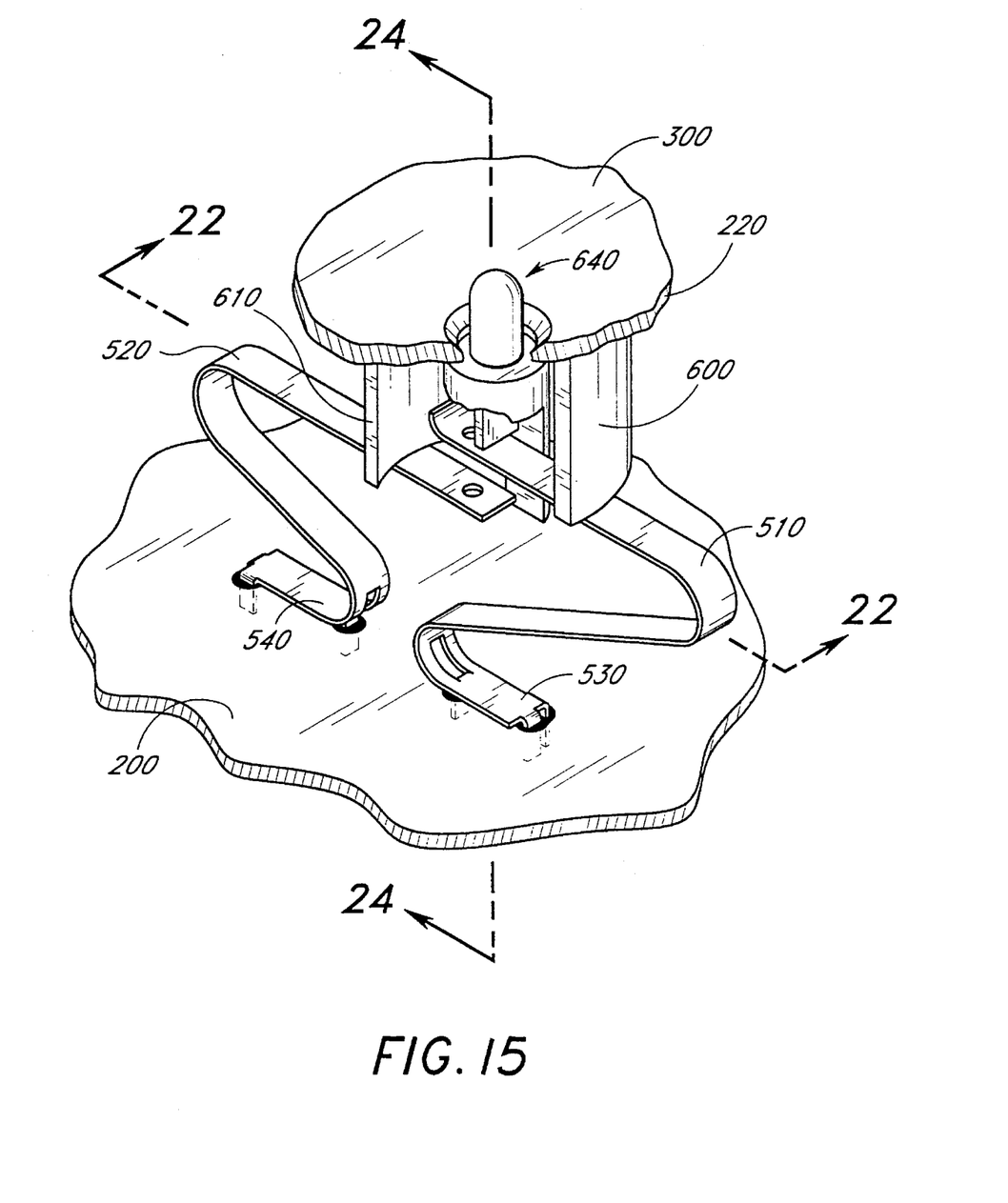
FIG. 15 illustrates a partially broken away perspective view of a notebook computer incorporating a suspend switch constructed in accordance with the present invention.

FIG. 15 is a partially broken away perspective view of the suspend switch 500 of the present invention installed on the printed circuit board 200. The suspend switch 500 comprises elements that automatically accommodate the differing dimensions which may occur within the typical manufacturing tolerances of the printed circuit board 200 and the plastic upper half 220. In particular, the suspend switch 500 comprises a first switch contact 510 and a second switch contact 520 which are mounted proximate to each other on the printed circuit board 200 using conventional printed circuit board manufacturing techniques, such as wave soldering, or the like.

Figure 16:
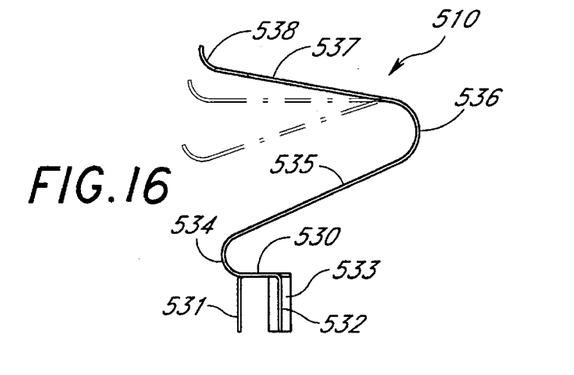
FIG. 16 is a side elevational view of the upper contact of the suspend switch.
Figure 17:
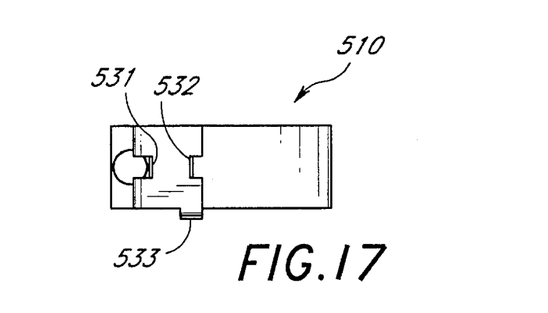
FIG. 17 is a bottom view of the upper contact of the suspend switch.
Figure 18:
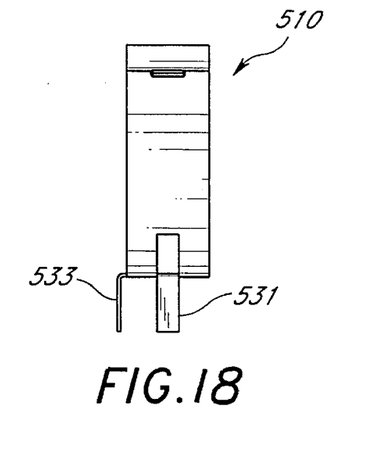
FIG. 18 is a rear view of the upper contact of the suspend switch.

As illustrated in more detail in the side elevational, bottom and end views in FIGS. 16, 17 and 18, respectively, the first switch contact 510, referred to hereinafter as the upper contact 510 includes a generally flat base portion 530 having a plurality (e.g., three) of solder tabs 531, 532, 533 which are inserted into the printed circuit board 200 and soldered therein. The base portion 530 is connected to a first arcuate portion 534 which provides a transition to a first end of a first arm portion 535. The first arm portion 535 is disposed at an angle of approximately 25° with respect to the base portion 530. A second end of the first arm portion 535 is connected to a second arcuate portion 536 which provides a transition to a first end of a second arm portion 537. The second arm portion 537 is disposed at an angle of approximately 35° with respect to the first arm portion 535 and 10° with respect to the base portion 530. A second end of the second arm portion ends in a short arcuate portion 538. In the free state shown (i.e., state in which no force is applied to the upper contact 510), the second end of the second arm portion 537 proximate to the short arcuate portion 538 is spaced approximately 0.37 inch from the plane of the base portion 530.

Figures 19, 20, 21:
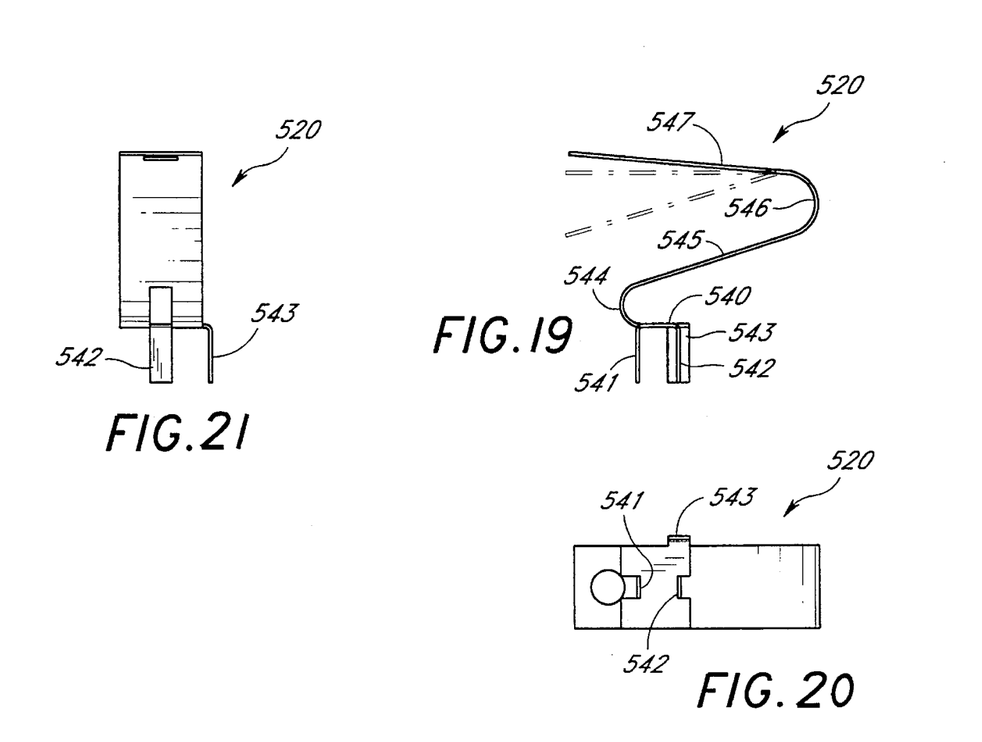
FIG. 19 is a side elevational view of the lower contact of the suspend switch.
FIG. 20 is a bottom view of the lower contact of the suspend switch.
FIG. 21 is a rear view of the lower contact of the suspend switch.

As illustrated in more detail in the side elevational, bottom and end views in FIGS. 19, 20 and 21, respectively, the second switch contact 520, referred to hereinafter as the lower contact 520 includes a generally flat base portion 540 having a plurality (e.g., three) of solder tabs 541, 542, 543 which are inserted into the printed circuit board 200 and soldered therein. The base portion 540 is connected to a first arcuate portion 544 which provides a transition to a first end of a first arm portion 545. The first arm portion 545 is disposed at an angle of approximately 17° with respect to the base portion 540. A second end of the first arm portion 545 is connected to a second arcuate portion 546 which provides a transition to a first end of a second arm portion 547. The second arm portion 547 is disposed at an angle of approximately 22° with respect to the first arm portion 545 and 5° with respect to the base portion 540. In the free state shown (i.e., state in which no force is applied to the lower contact 520), a second end of the second arm portion 547 is spaced approximately 0.317 inch from the plane of the base portion 540.

The upper contact 510 and lower contact 520 preferably comprise an electrically conductive spring metal, such as beryllium copper alloy 25, which in the preferred embodiment is selected to be approximately 0.006 inch thick and approximately 0.15 inch wide. After forming the two contacts 510, 520 to the shapes illustrated in FIGS. 16–21, the two contacts 510, 520 are heat treated at 600° F. for approximately two hours to obtain a ½ HT condition (i.e., approximately one-half of the maximum temper of the beryllium copper alloy). Thus, the two contacts 510, 520 are sufficiently resilient to deform by bending at the respective arcuate portions 534, 536; 544, 546 in response to an applied force and to return to their respective initial shapes after the force is removed as illustrated by the phantom lines in FIGS. 16 and 19. It can be seen that the spring metal in the two contacts 510, 520 causes the free ends of the two contacts 510, 520 to be biased away from the printed circuit board 200 and toward the upper half 220 of the base portion 110 when the applied force is removed.

Figure 22:
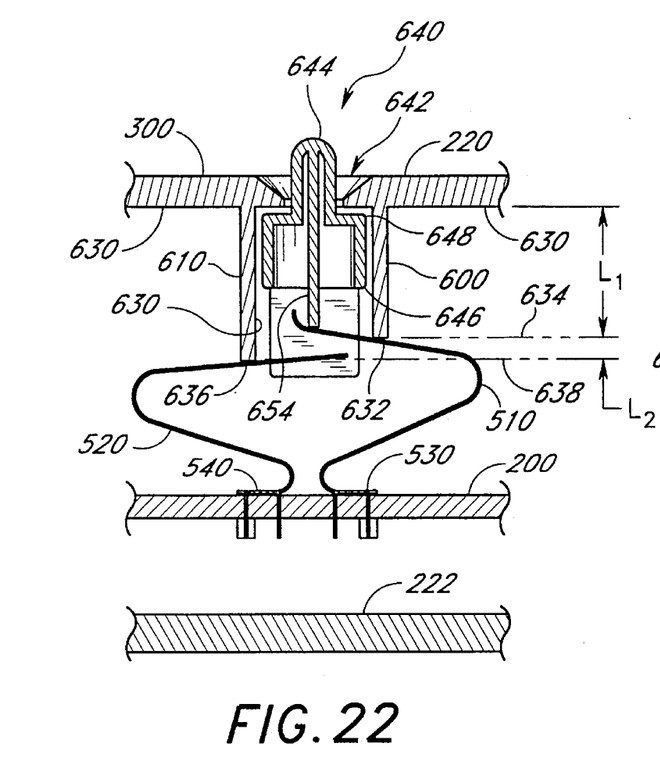
FIG. 22 is a partial cross-sectional view taken along the lines 22—22 in FIG. 15 showing the suspend switch in its unactivated position.

As illustrated in a cross-sectional view in FIG. 22, when the upper contact 510 and the lower contact 520 are mounted on the primed circuit board 200 and the printed circuit board 200 is mounted between the upper half 220 and the lower half 222 of the base portion 110, the two contacts 510, 520 engage a first projection 600 and a second projection 610, respectively, molded into the upper half 220. The first projection 600 has a first length $L_1$ with respect to an inside surface 630 of the upper half 220 such that an end 632 of the first projection 600 lies in a first plane 634. The inside surface 630 is parallel to the top surface 300 of the upper half 220 and is spaced from the top surface 220 by the thickness of the molded plastic, which is approximately 0.080 inch thick. The second projection 610 extends further from the inside surface 630 than the first projection 600 by a distance $L_2$ such that an end 636 of the second projection 610 lies in a second plane 638 substantially parallel to the first plane 634. In the preferred embodiment, the distance $L_2$ is selected so that the two contacts 510, 520 are spaced apart from each other by approximately 0.035 inch. For example, in one particularly preferred embodiment, the first length $L_1$ is approximately 0.205 inch and the distance $L_2$ is approximately 0.035 inch.

When installed as illustrated in FIG. 22, the upper contact 510 is deflected approximately 10° from its free state (i.e., its undeflected state) and the lower contact 520 is deflected approximately 5° from its free state. Thus, the upper contact 510 and the lower contact 520 are forced against the respective first projection 600 and second projection 610 when the surface of the printed circuit board 200 is mounted approximately 0.3 inch from the second projection 610 and approximately 0.33 inch from the first projection 600. If the printed circuit board 200 is mounted farther from the two projections 600, 610, the resilience of the two contacts 510, 520 will still cause the two contacts 510, 520 to push against the respective projections 600, 610. Similarly, if the primed circuit board 200 is mounted closer to the two projections 600, 610, the flexibility of the two contacts 510, 520 permits the two contacts to bend and accommodate the shorter distances.

An actuator 640, comprising Delrin® or other suitable electrically nonconductive material, is mounted within a generally circular opening 642 formed in the upper half 220 of the base portion 110 between the two projections 600, 610. As illustrated in FIG. 22, the actuator 640 has a cylindrical upper portion 644 which fits within the opening 642 and which has a diameter sufficiently smaller than the diameter of the opening 642 to provide adequate clearance to allow the upper portion 644 to easily move up and down within the opening 642. For example, in the preferred embodiment, the opening 642 has an inside diameter of approximately 0.156 inch and the upper portion 644 has an outside diameter of approximately 0.14 inch. The actuator 640 has a cylindrical lower portion 646 which has a diameter greater than the diameter of the opening 642 such that a shoulder 648 precludes the lower portion 646 from passing through the opening 642. For example, in the preferred embodiment, the lower portion 646 has an outside diameter of approximately 0.27 inch. Thus, the actuator 640 is constrained below the opening 642.

The length of the upper portion 644 is sufficient to extend approximately 0.04 inch above the top surface 300 when the shoulder 648 is engaged with the inside surface 630.

Figure 23:
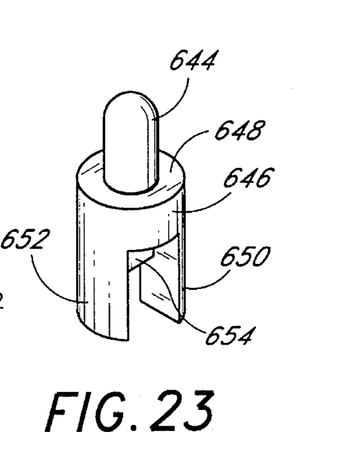
FIG. 23 is an enlarged, partially broken, perspective view of the actuator of the suspend switch showing the three projections extending from its lower portion.
Figure 24:
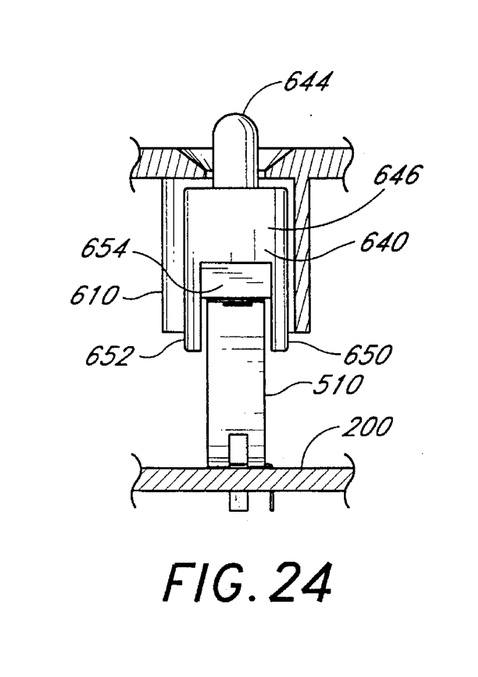
FIG. 24 is a partial cross-sectional view taken along the lines 24—24 in FIG. 15 showing the positioning of the actuator with respect to the upper contact.

As shown in more detail in FIG. 23, the actuator 640 includes a first projection 650, a second projection 652 and a third projection 654 which extend from the bottom of the upper portion 644. The first projection 650 and the second projection 652 are generally planar in construction and are disposed in parallel and spaced apart by approximately 0.17. As illustrated in FIGS. 23 and 24, the first contact 510 and the second contact 520 fit between the two projections 650, 652 and are constrained therebetween. The third projection 654 is substantially shorter than the first projection 650 and the second projection 652 and extends perpendicularly between the first projection 650 and the second projection 652, as shown most clearly in FIG. 24. The length of the third projection 654 with respect to the shoulder 648 is selected so that the third projection 654 rests upon the upper contact 510. For example, in the preferred embodiment, the third projection has a length of approximately 0.200 inch. Thus, assuming all the components are constructed within the mid-range of their respective tolerances, the actuator 640 will rest with the shoulder 648 approximately 0.005 inch below the inside surface 630. Furthermore, no pressure, other than the minimal weight of the actuator 640 is applied against the upper contact 510. Thus, the upper contact 510 remains spaced apart from the lower contact 520 when no force is applied to the upper portion 644 of the actuator 640.

Figure 25:
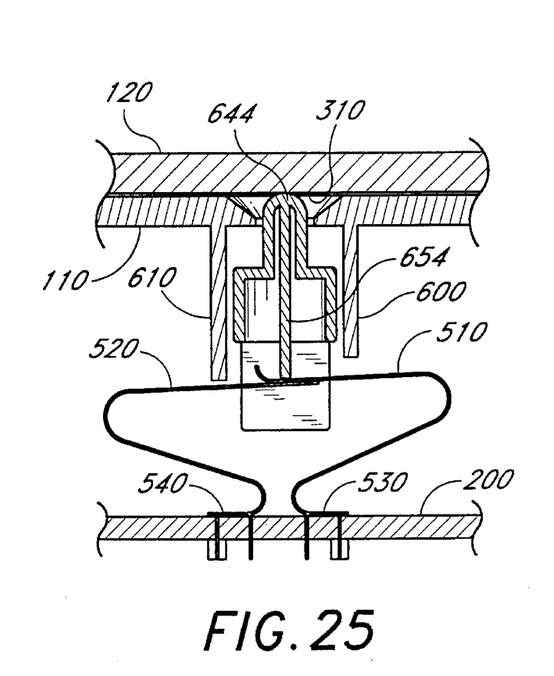
FIG. 25 is a partial cross-sectional view similar to FIG. 22 showing the operation of the suspend switch when activated by closing the cover portion of the notebook computer.

As illustrated in FIG. 25, when the cover portion 120 is closed against the base portion 110, the engaging surface 310 of the cover portion 120 pushes against the upper portion 644 of the actuator 640. The force thus applied causes the third projection 654 to push the second arm portion 537 of the upper contact 510 downward into electrical and mechanical engagement with the second arm portion 547 of the lower contact 520. The length of the upper portion 644 of the actuator 640 is selected to extend sufficiently above the upper surface 300 so that the actuator 640 continues to move after the upper contact 510 engages the lower contact 520. Because of the angles of the second arm portion 537 of the upper contact 510 and the second arm portion 547 of the lower contact 520, the two contacts second arm portions 537, 547 move laterally with respect to each other to cause a wiping movement between the two contacts. One skilled in the art will appreciate that the wiping movement, as opposed to simple point contact, improves the quality of the electrical contact between the two arm portions 537, 547.

It can be seen that if the length of upper portion 644 of the actuator 640 is greater than the preferred length, the second arm portion 537 of the upper contact 510 will continue to move downward long after it has made contact with the second arm portion 547 of the lower contact 520. Unlike prior switches, the suspend switch 500 of present invention does not impede the further movement as the resilience of the two contacts 510, 520 readily accommodate the additional movement. Thus, the suspend switch 500 accommodates significantly greater overtravel than known conventional switches. Further, as discussed above, the pre-travel of the suspend switch 500 is determined by the differences in the lengths of the first projection 600 and the second projection 610. By only having to control the relative lengths of the two projections 600, 610, the pre-travel of the switch 500 can be tightly controlled. Finally, because of the resilience of the two contacts 510, 520, when the cover portion 120 is moved away from the base portion 110, the contacts 510, 520, and particularly the upper contact 510, push the actuator 640 upward. The lower contact 520 is stopped by the longer second projection 610 and the upper contact 510 continues to move until the two contacts 510, 520 electrically and mechanically disengage to open the switch 500. Thus, no additional spring is required to restore the contacts 510, 520 to their original disengaged positions or to move the actuator 640 to its starting position.

This invention may be embodied in other specific forms without departing from the essential characteristics as described herein. The embodiments described above are to be considered in all respects as illustrative only and not restrictive in any manner. The scope of the invention is indicated by the following claims rather than by the foregoing description. Any and all changes which come within the meaning and range of equivalency of the claims are to be considered within their scope.

What is claimed is:

1. A printed circuit board mounted switch which accommodates varying distances between a printed circuit board on which said switch is mounted and a surface which defines the location of an actuator which actuates said switch, said switch comprising:

a first switch contact which is electrically and mechanically connected to said printed circuit board, said first switch contact having a first contact portion and a first spring-like mounting portion, said first spring-like mounting portion allowing said first contact portion to be positioned a varying distance from said printed circuit board;

a second switch contact which is electrically and mechanically connected to said printed circuit board, said second switch contact having a second contact portion and a second spring-like mounting portion, said second spring-like mounting portion allowing said second contact portion to be positioned a varying distance from said printed circuit board;

a first contact positioner mounted on said surface, said first contact positioner positioning said first contact portion at a first predetermined location with respect to said surface;

a second contact positioner mounted on said surface, said second contact positioner positioning said second contact portion at a second predetermined location with respect to said first predetermined location, said second predetermined location being different from said first predetermined location to space said first contact portion apart from said second contact portion; and an actuator mounted with respect to said surface, said actuator moving with respect to said first contact positioner and said second contact positioner to move said first contact portion into electrical and mechanical engagement with said second contact portion to close said switch.

2. The printed circuit board mounted switch as defined in claim 1, wherein the movement of said first contact portion with respect to said second contact portion for electrical and mechanical engagement is a wiping movement.

3. The printed circuit board mounted switch as defined in claim 1, wherein said actuator is slidably mounted with respect to said surface.

4. The printed circuit board mounted switch as defined in claim 1, wherein said first and second contact positioners each have a different length.

5. The printed circuit board mounted switch as defined in claim 1, wherein said first and second contact positioners each have first and second ends, said first ends of said first and second contact positioners being mounted on said surface and said second ends of said first and second contact positioners each being disposed at a different distance from said surface.

6. A switch for a printed circuit board mounted within an enclosure and activated by a force applied external to said enclosure, said switch comprising:

a first resilient contact having a respective first end portion electrically and mechanically mounted on said printed circuit board and having a respective second free end portion;

a second resilient contact having a respective first end portion electrically and mechanically mounted on said circuit board and having a respective second free end portion;

a first projection extending from an inside surface of said enclosure, said free end portion of said first contact resting against said first projection;

a second projection extending from said inside surface of said enclosure, said free end portion of said second contact resting against said second projection, said free end portion of said second contact being spaced apart from said free end portion of said first contact by a distance determined by said first and second projections; and an actuator which extends through said enclosure and which moves against said free end portion of said first contact, said actuator responsive to an applied force to move said free end portion of said first contact into electrical engagement with said free end portion of said second contact.

7. A switch for a printed circuit board within an enclosure having a base and a cover, said base having a top and a bottom, said cover having a surface, said surface being in proximity with said top of said base when said cover is closed with respect to said base, said printed circuit board being mounted within said base between said top and bottom, said switch comprising:

first and second flexible electrical conductors having respective first ends mounted on said printed circuit board and having respective second ends biased to extend toward said top of said base;

first and second projections mounted with respect to said top of said base between said top and said printed circuit board, said first projection positioning said second end of said first conductor away from said top at a first location, said second projection positioning said second end of said second conductor away from said top at a second location, said second location being spaced apart from said first location by a predetermined distance such that said second end of said first conductor is electrically isolated from said second end of said second conductor; and an actuator which extends through said top of said base, said actuator being in engagement with said second end of said first conductor, said actuator being engaged by said surface of said cover when said cover is closed with respect to said base, said actuator moving said second end of said first conductor toward said second end of said second conductor to effect electrical contact between said second ends.

8. The printed circuit board mounted switch as defined in claim 7, wherein said second end of said first flexible electrical conductor is positioned closer to said top than said second end of said second flexible electrical conductor.

9. The printed circuit board mounted switch as defined in claim 7, wherein said first and second flexible electrical conductors each include one or more arcuate portions.

10. The printed circuit board mounted switch as defined in claim 7, wherein said first and second flexible electrical conductors comprise electrically conductive spring material.

11. The printed circuit board mounted switch as defined in claim 7, wherein said first and second flexible electrical conductors comprise beryllium copper alloy.

12. A switch for a printed circuit board mounted within an enclosure and activated by a force applied external to said enclosure, said switch comprising:

a first projection attached to an inside surface of said enclosure;

a second projection attached to said inside surface of said enclosure;

a first resilient contact having a respective first end portion electrically and mechanically mounted to said printed circuit board and having a respective second free end portion, said free end portion of said first contact resting against said first projection at a first contact resting location, said first contact resting location being in a first plane;

a second resilient contact having a respective first end portion electrically and mechanically mounted to said circuit board and having a respective second free end portion, said free end portion of said second contact resting against said second projection at a second contact resting location, said second contact resting location being in a second plane substantially parallel with said first plane, said free end portion of said second contact being spaced from said free end portion of said first contact by a distance substantially equal to a distance between said first plane and said second plane; and an actuator which extends through said enclosure and which moves against said free end portion of said first contact, said actuator responsive to an applied force to move said free end portion of said first contact into electrical engagement with said free end portion of said second contact.

13. A method of installing a cover actuated switch in an electronic device having a base with a printed circuit board mounted therein and having a cover moveable with respect to the base, said method comprising the steps of:

mounting a first end of a first flexible contact to said printed circuit board;

mounting a first end of a second flexible contact to said printed circuit board;

mounting said printed circuit board to said base with respective second ends of said first and second contacts proximate to an inside surface of a wall of said base, said inside surface having projections thereon which engage said first and second contacts at first and second locations to position said second end of said first contact in a spaced apart relationship with said second end of said second contact; and positioning an actuator through said wall of said base such that a first end of said actuator engages said second end of said first contact and a second end of said actuator is exposed in engageable relationship to said cover, said actuator moving when engaged by said cover to move said second end of said first contact into electrical engagement with said second end of said second contact.

* * * * *

UNITED STATES PATENT AND TRADEMARK OFFICE
CERTIFICATE OF CORRECTION

PATENT NO. : 5,612,520

DATED : March 18, 1997

INVENTORS : Thomas Toedtman, et al.

It is certified that error appears in the above-identified patent and that said Letters Patent is hereby corrected as shown below:

In column 13 at line 18, change "The primed circuit" to --The printed circuit.

Signed and Sealed this

Twenty-ninth Day of May, 2001

*Attest:*

NICHOLAS P. GODICI

*Attesting Officer*   *Acting Director of the United States Patent and Trademark Office*